(12) United States Patent
Yin

(10) Patent No.: US 8,660,069 B2
(45) Date of Patent: Feb. 25, 2014

(54) METHOD FOR CODING ADDITIONAL INFORMATION IN A MEDIA ACCESS PROTOCOL (MAP) MESSAGE

(75) Inventor: Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1492 days.

(21) Appl. No.: 11/931,687

(22) Filed: Oct. 31, 2007

(65) Prior Publication Data

US 2009/0109931 A1 Apr. 30, 2009

(51) Int. Cl.
*H04W 4/00* (2009.01)
*H04B 7/216* (2006.01)

(52) U.S. Cl.
USPC .......................................... 370/329; 370/335

(58) Field of Classification Search
USPC .................................. 370/328–335
See application file for complete search history.

(56) References Cited

U.S. PATENT DOCUMENTS

| | | | |
|---|---|---|---|
| 2004/0127244 A1* | 7/2004 | Matsumoto et al. | 455/517 |
| 2006/0029011 A1* | 2/2006 | Etemad et al. | 370/311 |
| 2006/0153112 A1* | 7/2006 | Lim et al. | 370/310 |
| 2007/0070905 A1* | 3/2007 | Oliver et al. | 370/235 |
| 2007/0286066 A1* | 12/2007 | Zhang et al. | 370/208 |
| 2008/0062904 A1* | 3/2008 | Tzu-Ming | 370/312 |
| 2008/0075185 A1* | 3/2008 | Park et al. | 375/260 |
| 2008/0107073 A1* | 5/2008 | Hart et al. | 370/330 |
| 2008/0144567 A1* | 6/2008 | Agami et al. | 370/329 |
| 2008/0198830 A1 | 8/2008 | Mohanty | |
| 2008/0299963 A1* | 12/2008 | Balachandran et al. | 455/422.1 |

* cited by examiner

*Primary Examiner* — Brandon Renner
(74) *Attorney, Agent, or Firm* — Grossman, Tucker, Perreault & Pfleger, PLLC

(57) ABSTRACT

Disclosed is a method for reducing number of bits in a Media Access Protocol (MAP) message. The MAP message comprises a plurality of information elements grouped into one of a first set of information elements and a second set of information elements. The first set of information elements are arranged in a pre-defined order and each of the second set of information elements is inserted into one of a prefix position to the pre-defined order, a suffix position to the pre-defined order and an intermediate position in-between two information elements in the pre-defined order. Each information element of the second set of information elements is then coded based on position of the information element relative to the position of the first set of information elements in the pre-defined order, thereby reducing the number of bits in the MAP message.

12 Claims, 6 Drawing Sheets

| Index Order | Code |
|---|---|
| 1243 | 0000 |
| 1324 | 0001 |
| 1342 | 0010 |
| 1423 | 0011 |
| 1432 | 0100 |
| 2134 | 0101 |
| 2143 | 0110 |
| 2314 | 0111 |
| 2341 | 1000 |
| 2413 | 1001 |
| 2431 | 1010 |
| 3124 | 1011 |
| 3142 | 1100 |
| 3214 | 1101 |
| 3241 | 1110 |
| 3412 | 1111 |

402, 404

| 602 | CID entry | 0-3 | 4-7 | 8-15 | 16+ |
|---|---|---|---|---|---|
| 604 | Additional bits | 1 | 2 | 3 | 4 |

FIG. 6

METHOD FOR CODING ADDITIONAL INFORMATION IN A MEDIA ACCESS PROTOCOL (MAP) MESSAGE

FIELD OF THE DISCLOSURE

The present disclosure generally relates to resource allocation over a shared wireless medium, and more particularly, to a method for coding additional information in a Media Access Protocol (MAP) message for resource allocation in the shared wireless medium.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

FIG. 6 illustrates number of additional bits required for coding each CID entry, in accordance with an embodiment of the present disclosure.

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting. The terms "a" and "an" herein do not denote a limitation of quantity, but rather denote the presence of at least one of the referenced item.

The present disclosure provides a method for coding additional information in a Media Access Protocol (MAP) message transmitted by a base station to a plurality of subscriber stations in a wireless communication system. The MAP message comprises a plurality of information elements. The plurality of information elements can be arranged in different orders. Such arrangement can be used to code additional information for the MAP message.

Figure 1:
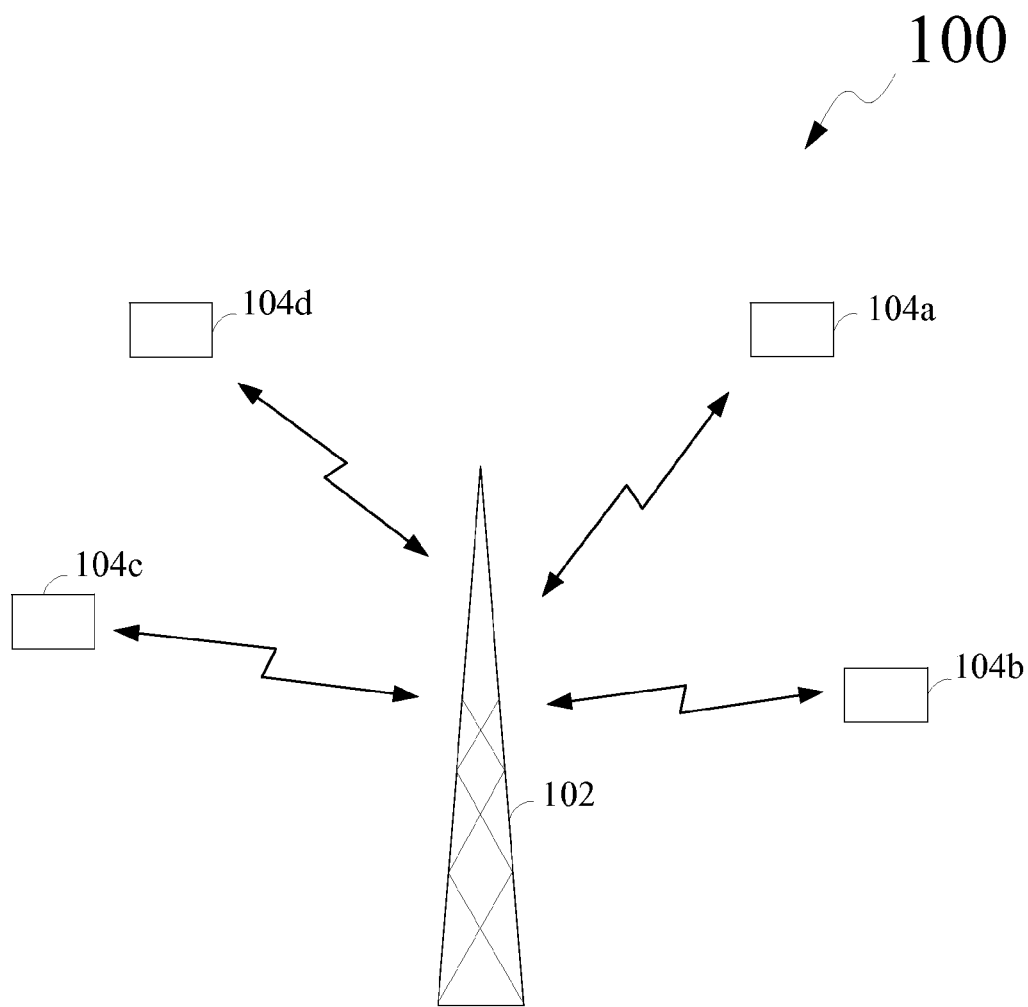
FIG. 1 depicts an environment in which various embodiments of the present disclosure may be practiced.

FIG. 1 depicts an environment 100 in which various embodiments of the present disclosure may be practiced The environment 100 includes a base station 102 and a plurality of subscriber stations such as a subscriber station 104a, a subscriber station 104b, a subscriber station 104c and a subscriber station 104d. The subscriber stations 104a, 104b, 104c and 104d will hereinafter be collectively referred to as plurality of subscriber stations 104. Examples of subscriber stations such as subscriber station 104a may include wireless digital phones, personal digital assistants (PDAs) with wireless modems and the like. It will be evident to those skilled in the art that the base station 102 and the plurality of subscriber stations 104 include means for transmitting and receiving information over a wireless medium. Further, the base station 102 may include components such as a processor, a memory, a storage module and a resource allocation scheduler for performing typical functions of the base station 102. Examples of resources allocated to the plurality of information elements 104 by the base station 102 may include channel-bandwidth, time slots, Quality of Service (QoS) and the like.

The base station 102 and the plurality of subscriber stations 104 communicate over an air interface using existing wireless standards and as such configure a wireless communication system. An example of a wireless standard for the wireless communication system may include an Institute of Electrical and Electronics Engineers (IEEE) 802.16 standard, also known as Worldwide Interoperability for Microwave Access (WiMAX).

The WiMAX is based on wireless metropolitan area networking (WMAN) standards developed by IEEE 802.16 group. The IEEE 802.16 standard standardizes two aspects of the air interface—the physical layer (PHY) and the Media Access Control (MAC) layer. Scalable Orthogonal Frequency Division Multiple Access (OFDMA) based on Orthogonal Frequency Division Multiplexing (OFDM) is used as a PHY transmission scheme. The MAC layer provides an interface between higher transport layers and the PHY. The MAC layer takes packets, referred to as MAC service data units (MSDUs) from higher transport layers and organizes them into MAC protocol data units (MPDUs) for transmission over the air interface. The IEEE 802.16 standard design for MAC includes convergence sub-layers on top of the MAC layer to interface with higher transport layers such as Ethernet, Internet Protocol (IP), Asynchronous Transfer Mode (ATM) and the like.

The base station 102 and the plurality of subscriber stations 104 communicate using two independent channels: a downlink channel from the base station 102 to the plurality of subscriber stations 104 and an uplink channel from subscriber stations of the plurality of subscriber stations 104 to the base station 102. The downlink channel will hereinafter be referred to as downlink (DL) and the uplink channel will hereinafter be referred to as uplink (UL).

The base station 102 and the plurality of subscriber stations 104 exchange information, in the downlink and the uplink, in the form of radio frames (not shown). A radio frame may include data bits, management control bits and such other information. It will be known to a person skilled in the art that one of a Time Division Duplexing (TDD) and a Frequency Division Duplexing (FDD) technique may be used to share the air interface between the base station 102 and the plurality of subscriber stations 104. In TDD mode, the radio frame is divided into a downlink sub-frame followed by an uplink sub-frame after a small guard interval. Different traffic profiles may be supported by varying downlink sub-frame to uplink sub-frame ratio. For example, the downlink sub-frame to uplink sub-frame ratio may be varied from 3:1 to 1:1 to vary time for which DL transmission or an UL transmission takes place to support different traffic profiles. In FDD mode, the downlink sub-frame and the uplink sub-frame are transmitted simultaneously using a plurality of carrier frequencies.

The downlink sub-frame includes a downlink preamble that is used for physical layer (PHY) procedures, such as time and frequency synchronization and initial channel estimation. The downlink preamble is followed by a frame control header (FCH), which provides frame configuration information, such as Media Access Protocol (MAP) message length, modulation and coding scheme and usable sub-carriers. The plurality of subscriber stations 104 may be allocated data regions within the downlink sub-frame and uplink sub-frame and these allocations are specified in an downlink MAP message (DL-MAP) and in a uplink MAP message (UL-MAP) that are broadcast following the FCH in the downlink sub-frame. The UL-MAP and the DL-MAP (hereinafter collectively referred to as a MAP message) include a burst profile for each subscriber station of the plurality of subscriber stations 104, which defines modulation and coding schemes used in the downlink. The uplink sub-frame includes a plurality of uplink bursts from subscriber stations of the plurality of subscriber stations 104. A portion of the uplink sub-frame is allotted for contention based access. The uplink sub-frame may be used as a ranging channel for performing time, frequency and power adjustments during network entry as well as on periodic durations thereafter. The MAP message is explained in detail in conjunction with FIG. 2.

Figure 2:
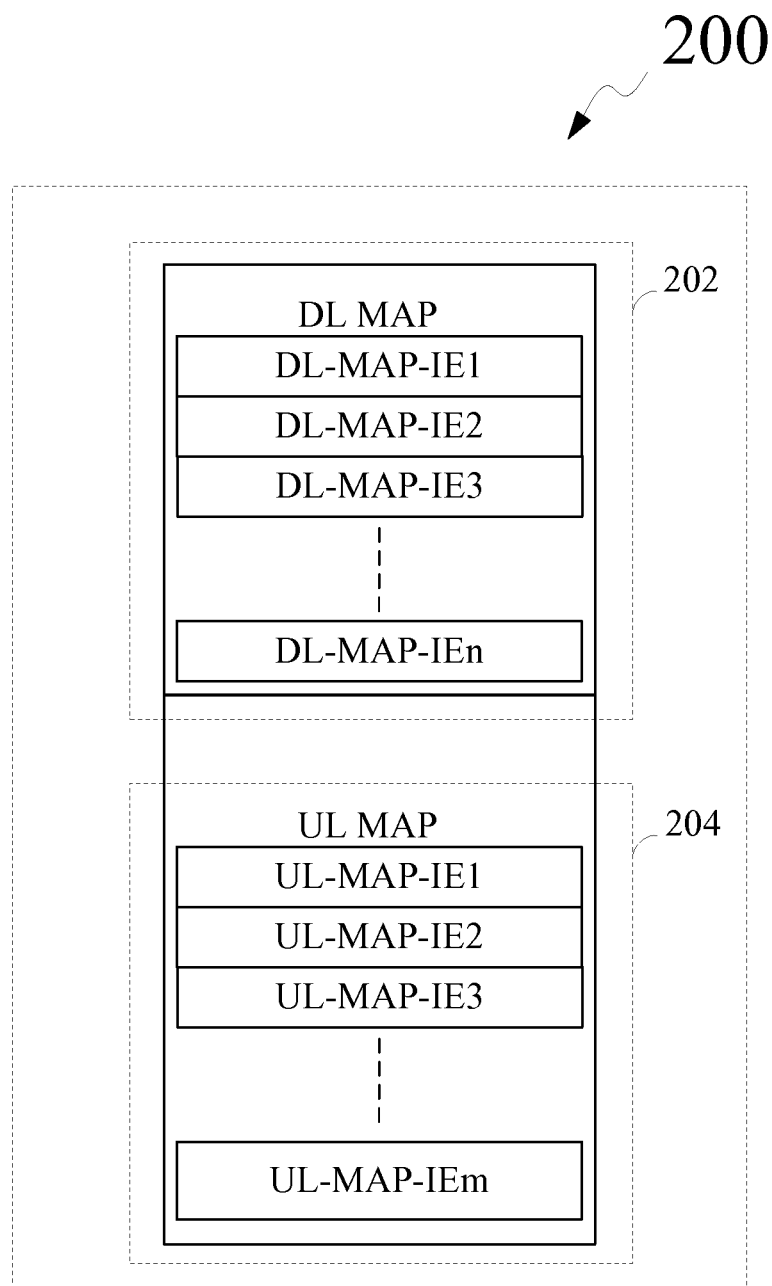
FIG. 2 illustrates a simplified structure of a Media Access Protocol (MAP) message.

FIG. 2 illustrates a simplified structure of a Media Access Protocol (MAP) message 200. The MAP message 200 may be used by the base station 102 to communicate resource allocation information to the plurality of subscriber stations 104. As explained above, the MAP message 200 includes a downlink MAP (DL-MAP) message 202 and an uplink MAP (UL-MAP) message 204. The MAP message 200 includes a plurality of information elements. The plurality of information elements of the DL-MAP message 202 such as DL-MAP-IE1, DL-MAP-IE2, DL-MAP-IE3 (hereinafter collectively referred to as DL-MAP IEs) and the plurality of information elements of the UL-MAP message 204 such as UL-MAP-IE1, UL-MAP-IE2, UL-MAP-IE3 (hereinafter collectively referred to as UL-MAP IEs) together constitute the plurality of information elements of the MAP message 200.

The MAP message 200 is illustrated in a simplified format and it will be evident to those skilled in the art that the DL-MAP message 202 may include parameters such as a base station 102 identification, a resource allocation start time, a count of number of information elements. Similarly, it will be known to a person skilled in the art that the UL-MAP message 204 may include start time for each uplink transmission of the plurality of subscriber stations 104 and an Uplink Interval Usage Code (UIUC) for each burst.

Each of the plurality of information elements in the DL-MAP IEs may include information, such as but not limited to, a Downlink Interval Usage Code (DIUC) (not shown), an OFDMA symbol offset (not shown) for indicating the offset of OFDM symbol in which PHY burst starts, a sub-channel offset (not shown) for indicating a lowest-index OFDM sub-channel for carrying the burst, a boosting indicator (not shown) for indicating transmit power amplification, a number of OFDMA symbols (not shown) for indicating the number of OFDM symbols for carrying downlink PHY burst and number of sub-channels (not shown) for indicating the number of OFDMA sub-channels of successive indexes used to carry the PHY burst.

Each information element of the plurality of information elements in the MAP message 200 also includes a pre-defined parameter such as a Connection Identifier (CID) for uniquely identifying subscriber stations of the plurality of subscriber stations 104. The Connection Identifier (CID) uniquely identifies each connection of the base station 102 with a subscriber station of the plurality of subscriber stations 104. The CID associates resource allocation information in the MAP message 200 with the plurality of subscriber stations 104. The MAP message 200 is transmitted as a part of the radio frame explained in conjunction with FIG. 1. An increase in number of subscriber stations of the plurality of subscriber stations 104 results in an increase in number of information elements with an associated increase in number of bits in the MAP message 200 thereby increasing overhead and reducing reliability. The number of bits in the MAP message 200 may be reduced by reducing the number of bits in the CID. The WiMAX uses reduced CID (RCID) to notify intended subscriber stations of the plurality of subscriber stations 104 of resource allocation information. Typical values for RCID are 4, 8 and 12 bits. The number of bits in information elements of the plurality of information elements may be permutation coded to reduce the number of bits in the MAP message 200. The relation between the number of information elements in the MAP message 200 and the number of bits coded with permutation is depicted in FIG. 3.

Figure 3:
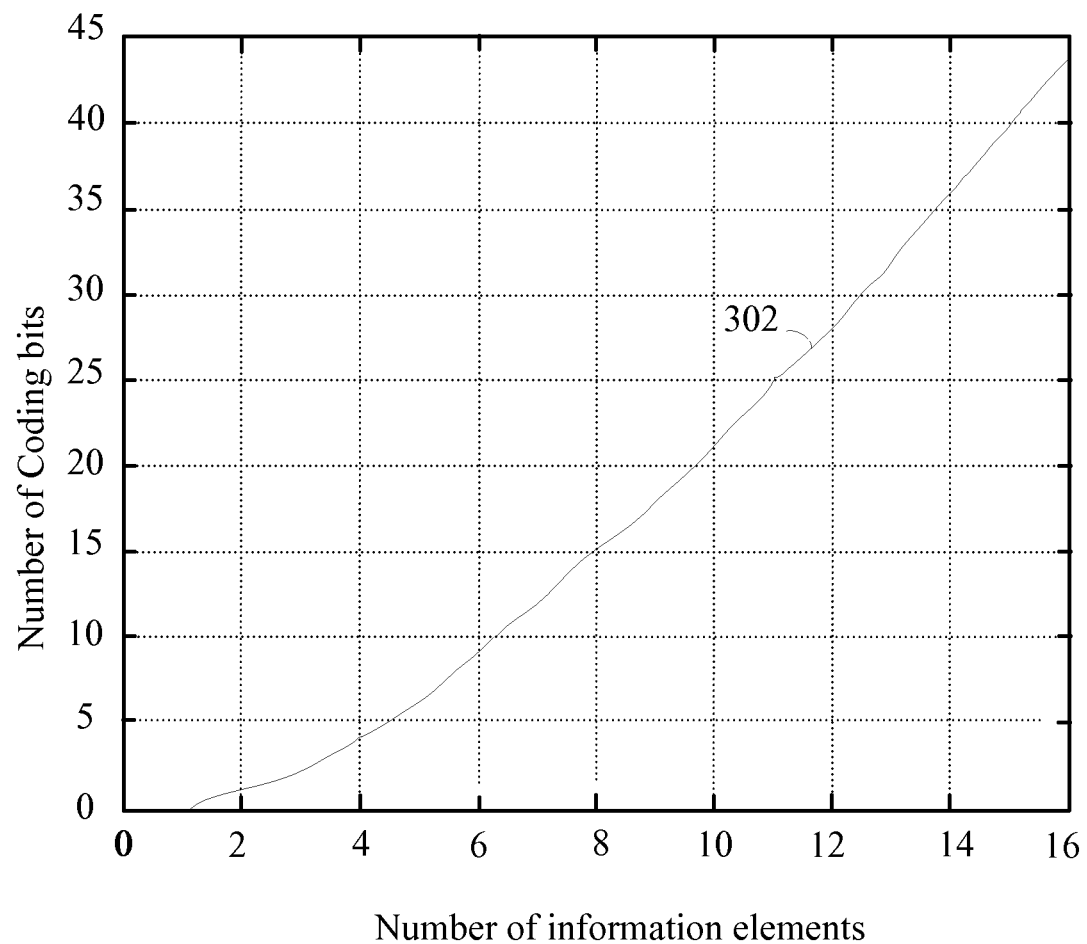
FIG. 3 is a graph 302 depicting variation in number of bits for permutation coding a plurality of information elements in the MAP message with change in number of information elements of the plurality of information elements in the MAP message.

FIG. 3 is a graph 302 depicting variation in number of bits for permutation coding the plurality of information elements in the MAP message 200 with change in number of information elements (M) of the plurality of information elements in the MAP message 200. For 'M' number of information elements in the MAP message 200, M! number of permutations are possible, which may be coded to carry $\log_2(M!)$ bits, approximately equal to M ($\log_2 M - 1.44$) bits. An increase in the number of information elements (M) in the MAP message 200 results in an increase in the number of bits for permutation coding the information elements of the plurality of information elements in the MAP message 200 as depicted by the graph 302 in FIG. 3. The X-axis of the graph 302 represents the number of information elements (M) in the MAP message 200 and the Y-axis represents the number of bits for permutation coding the information elements in the MAP message 200. As can be seen from the graph 302, additional 1 bit/per information element may be used with at least 4 information elements in the MAP message 200 and additional 2 bits per information elements may be used with at least 9 information elements in the MAP message 200.

Figure 4:
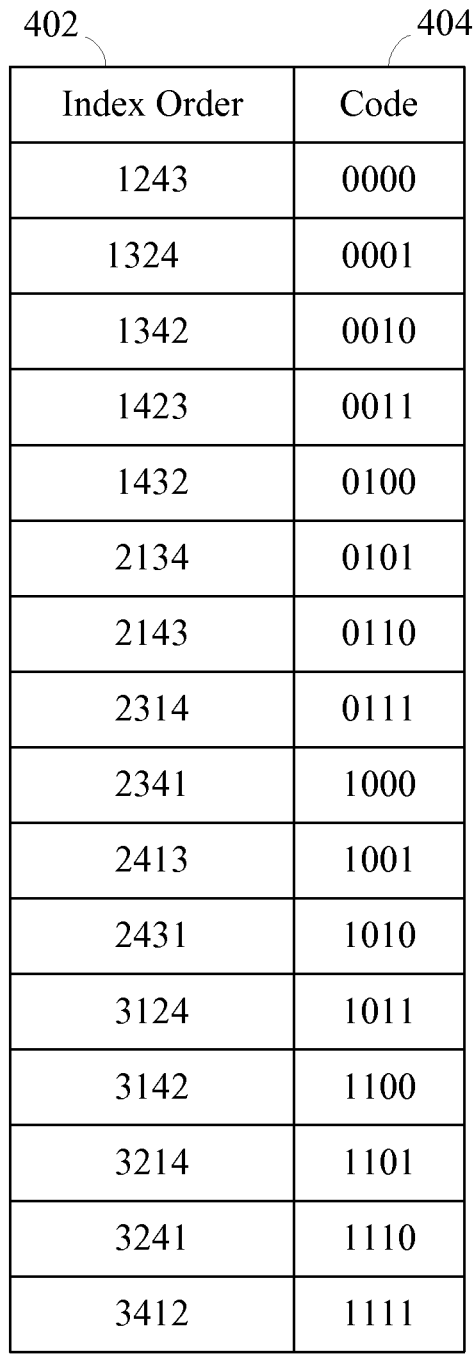
FIG. 4 illustrates an exemplary permutation coding scheme for permutation coding information elements of the plurality of information elements in the MAP message.

In one embodiment of the present disclosure, for 'M' number of information elements, $\log_2(M!)$ bits can be coded by permuting the order of the plurality of information elements. FIG. 4 illustrates an exemplary permutation coding scheme for permutation coding information elements of the plurality of information elements in the MAP message 200. The MAP message 200 (not shown) includes 4 information elements. The 4 information elements in the MAP message 200 are labeled 1, 2, 3 and 4 respectively. For 4 information elements, 4! or 24 permutations are possible; of which 16 possible permutations are depicted tabulated in a column 402 depicting order of index of the 4 information elements. The 16 possible permutations may be coded using 4 bits as illustrated in FIG. 4. Codes for the 16 possible permutations are depicted tabulated in column 404 in FIG. 4. For example, the code for permutation 3241 is 1101. Thus, at least one additional bit per information element may be provided for permutation coding 4 information elements in the MAP message 200.

In one embodiment of the present disclosure, the aforementioned, permutation coding scheme may further be modified to provide one bit per information element for any number of information elements greater than 4. Such a method for reducing number of bits required in the MAP message 200 is explained in conjunction with FIG. 5.

Figure 5:
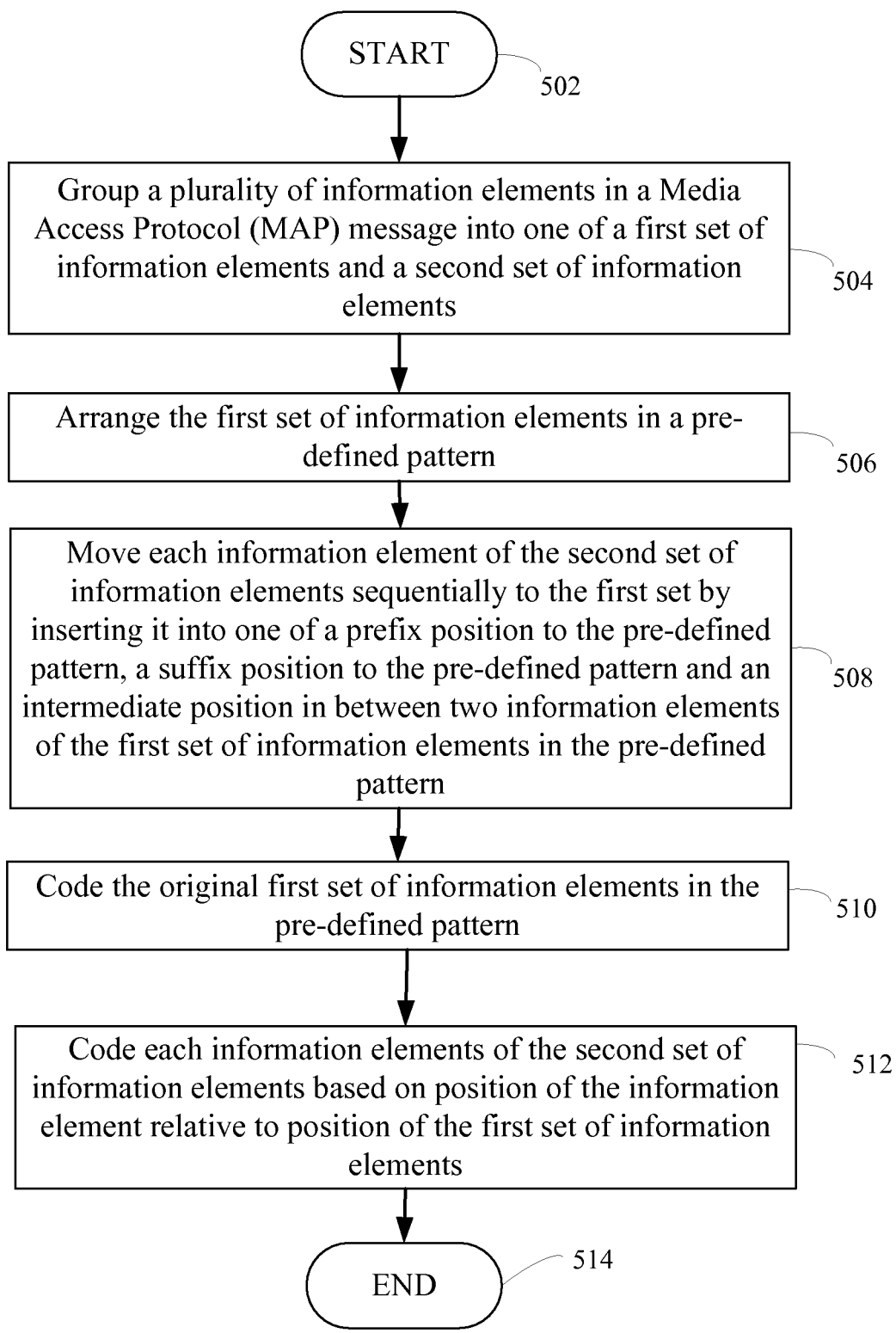
FIG. 5 is a flow diagram illustrating a method for reducing number of bits in a MAP message, in accordance with an embodiment of the present disclosure.

FIG. 5 is a flow diagram illustrating a method for reducing the number of bits in the MAP message such as the MAP message 200, in accordance with an embodiment of the present disclosure. The method initiates at 502. At 504, each information element of the plurality of information elements is grouped into one of a first set of information elements and a second set of information elements by a base station such as the base station 102. The plurality of information elements are then arranged prior to coding the plurality of information elements. At 506, the base station arranges the first set of information elements in a pre-defined pattern. At 508, each information element of the second set of information elements is inserted into one of a prefix position to the pre-defined pattern, a suffix position to the pre-defined pattern, and an intermediate position in between two information elements of the first set of information elements in the pre-defined pattern.

After arranging the order of the plurality of information elements, coding of the plurality of information elements is performed by the base station. At 510, the first set of information elements in the pre-defined pattern is coded. At 512, each information element of the second set of information elements is coded based on position of the information element relative to the position of the first set of information elements in the pre-defined pattern. At 514, the method ends when the number of bits in the MAP message 200 is reduced. The method will be explained in further detail in conjunction with a following example.

An exemplary MAP message such as the MAP message 200 includes a plurality of information elements. The plurality of information elements are grouped into a first set of information elements and the second set of information elements. The first set of information elements may be chosen to configure a kernel sequence. In case of 4 information elements forming a kernel sequence, if $c_{k1}$, $c_{k2}$, $c_{k3}$, and $c_{k4}$ are indices of the information elements in increasing order then an arrangement $C_4=[c_{k1}, c_{k2}, c_{k3}, c_{k4}]$ may be chosen as a starting 4 information element kernel sequence. The order of the information elements in the kernel sequence may be pre-defined and as such may be chosen as any one of a permutation of information elements of the first set of information elements. The information elements of the second set of information elements may then be arranged, with each element of the second set of information elements inserted in one of a prefix position to pre-defined order of the kernel sequence, a suffix position to the pre-defined order of the kernel sequence.

A permutation coding scheme such as the permutation coding scheme explained in conjunction with FIG. 4 may be chosen to code the information elements of the kernel sequence. The permutation coding scheme may further be defined to represent binary code 1 for each insertion of an information element of the second set of information elements in the prefix position to the pre-defined order of the kernel sequence. Therefore, $C_5=[c_5, C_4]$ may represent binary code 1. Similarly, the permutation coding scheme may be defined to represent binary code 0 for each insertion of an information element of the second set of information elements in the suffix position to the pre-defined order of the kernel sequence. Therefore, $C_5=[C_4, c_5]$ may represent binary code 0. Coding of each information element of the second set of information elements relative to the position of the information element with respect to the position of the kernel sequence permits the usage of only one bit per information element for any number of information elements greater than 4. Thus, the method reduces the number of bits required in the MAP message. The reduction in the number of bits may then be utilized to code additional information in the MAP message. During decoding, the kernel sequence $C_4$ is first determined and the remaining information elements may simply be decoded by checking their relative position to the kernel sequence $C_4$.

In one embodiment of the present disclosure, a similar coding scheme may be devised for coding the insertion of each new information element in the intermediate in-between position between two information elements in the previous information element sequence. The coding for insertion of each new information element may be designed to correspond to pre-defined number of coded bits. For example, if a MAP message includes N information elements and $C_N$ the permutation sequence for the N information elements, then for any next information element M, there are N+1 possible insertion points into $C_N$. Therefore, for Mth information element (M>4), [log 2 (M)] bits may be coded on its position relative to (M−1) existing information elements. The [log 2 (M)] bits may be implicitly added to each information element.

Since CID presents in every information element, the CID in the information elements of the MAP message may similarly be permutation coded to reduce the number of bits required for CID in the MAP message. The number of additional bits required to code CID entries is depicted in FIG. 6.

FIG. 6 illustrates number of additional bits required for coding each CID entry, in accordance with an embodiment of the present disclosure. As explained in conjunction with FIG. 5, each CID entry corresponds to one information element in the MAP message. FIG. 6 depicts a table including a row 602 and a row 604. The row 602 depicts the number of CID entries in the MAP message. The row 604 depicts the number of additional bits can be used to code the corresponding CID entries depicted in the row 602. As can be seen from the table depicted in FIG. 6, two additional bits may be used to code at least 4 information elements in the MAP message.

As explained in conjunction with FIG. 1, a CID in an information element in a MAP message uniquely identifies a subscriber station of the plurality of subscriber stations 104 for resource allocation purposes. For an N-bit CID used for a subscriber station of the plurality of subscriber stations 104, k Least Significant Bits (LSB) may be used as a Reduced CID (RCID). The number of LSB bits needed in the RCID is based on a maximum number of information elements in the MAP message and a probability of collision of a frame including the MAP message in a wireless medium. For M maximum number of information elements supported in a MAP message, the probability of collision is upper bounded by formula:

$$P_C \leq 1-(1-(1/2^k)^M \sim M/2^K$$

For value of M=16, k=8 reduces the probability of collision to 6%.

Using the permutation coding scheme explained in conjunction with FIG. 5, the number of bits required for RCID may further be reduced. For 4 information elements, one additional bit may be used for coding 4 CID entries, and remaining CID entries may be coded using [log 2 (M)] bits. The probability of collision may then be upper bounded by:

$$P_C \leq 1-(1-(1/2^7)^4 \times (1-(1/2^8)^4 \times (1-(1/2^9)^8 \sim 0.06$$

Therefore, with permutation coding, the RCID may be reduced without increasing the probability of collision.

As can be seen from the example, the number of bits in RCID are reduced from K=8 to K=6 without increasing the probability of collision. In addition to maintaining the probability of collision, the reduction in the number of bits in the CID may be used to code additional information to indicate any other property of the CID or any other information in the information element. Further, the permutation coding scheme precludes any need of additional signaling and also requires very little processing complexity.

As described above, the embodiments of the present disclosure may be embodied in the form of computer-implemented processes and apparatuses for triggering a wireless device to perform sensing of wireless spectrum for detecting interference in a wireless medium. Embodiments of the present disclosure may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the present disclosure. The present disclosure may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method for reducing number of bits in a Media Access Protocol (MAP) message transmitted by a base station to a plurality of subscriber stations in a wireless communication system, the MAP message comprising a plurality of information elements, wherein each information element of the plurality of information elements grouped into one of a first set of information elements and a second set of information elements, the method comprising:
arranging the plurality of information elements to define a pre-defined parameter identifying a subscriber station of the plurality of subscriber stations, wherein arranging the plurality of information elements comprises:
arranging the first set of information elements in a pre-defined pattern, and
inserting each information element of the second set of information elements into one of a prefix position to the pre-defined pattern, a suffix position to the pre-defined pattern;
coding the plurality of information elements, wherein coding the plurality of information elements comprises:

coding the first set of information elements in the pre-defined pattern, and
coding each information element of the second set of information elements based on position of the information element relative to position of the first set of information elements in the pre-defined pattern; and
a coding scheme utilizing one bit per information element for coding the plurality of information elements in the MAP message such that for M number of information elements, $\log_2(M!)$ bit can be coded by permuting the order of the plurality of information elements; and
identifying a subscriber station of the plurality of subscriber stations based on the pre-defined parameter.

2. The method of claim 1, wherein the pre-defined parameter is a Connection Identifier (CID) in each information element of the plurality of information elements.

3. The method of claim 2, wherein the coding the plurality of information elements comprises permutation coding the Connection Identifier (CID) of information elements of the plurality of information elements.

4. The method of claim 1, wherein coding of an information element of the second set of information elements inserted in the prefix position relative to the position of the first set of information elements in the pre-defined order corresponds to one of a binary code 1 and a binary code 0.

5. The method of claim 1, wherein coding of an information element of the second set of information elements inserted in the suffix position relative to the position of the first set of information elements in the pre-defined order corresponds to one of a binary code 1 and a binary code 0.

6. The method of claim 2, wherein coding of an information element of the second set of information elements inserted in the intermediate position in-between two information elements of the first set of information elements to pre-defined number of coded bits.

7. A computer program product embodied on a non-transitory computer readable medium for reducing number of bits in a Media Access Protocol (MAP) message transmitted by a base station to a plurality of subscriber stations in a wireless communication system, the MAP message comprising a plurality of information elements, each information element of the plurality of information elements grouped into one of a first set of information elements and a second set of information elements, the computer program product comprising a program module having instructions for:
arranging the plurality of information elements to define a pre-defined parameter identifying a subscriber station of the plurality of subscriber stations, wherein arranging the plurality of information elements comprises:
arranging the first set of information elements in a pre-defined order, and
inserting each information element of the second set of information elements into one of a prefix position to the pre-defined order, a suffix position to the pre-defined order and an intermediate position in-between two information elements of the first set of information elements in the pre-defined order;
coding the plurality of information elements, wherein coding the plurality of information elements comprises:
coding the first set of information elements in the pre-defined order, and
coding each information element of the second set of information elements based on position of the information element relative to position of the first set of information elements in the pre-defined order; and a coding scheme utilizing one bit per information element for coding the plurality of information elements in the MAP message such that for M number of information elements, $\log_2(M!)$ bit can be coded by permuting the order of the plurality of information elements; and identifying a subscriber station of the plurality of subscriber stations based on the pre-defined parameter.

8. The computer program product according to claim 7, wherein the pre-defined parameter is a Connection Identifier (CID) in each information element of the plurality of information elements.

9. The computer program product according to claim 8, wherein the instructions for coding the plurality of information elements comprises instructions for permutation coding the Connection Identifier (CID) of information elements of the plurality of information elements.

10. The computer program product according to claim 7, wherein the coding of an information element of the second set of information elements inserted in the prefix position relative to the position of the first set of information elements in the pre-defined order corresponds to one of a binary code 1 and a binary code 0.

11. The computer program product according to claim 7, wherein coding of an information element of the second set of information elements inserted in the suffix position relative to the position of the first set of information elements in the pre-defined order corresponds to one of a binary code 1 and a binary code 0.

12. The computer program product according to claim 7, wherein coding of an information element of the second set of information elements inserted in the intermediate position in-between two information elements of the first set of information elements in the pre-defined order corresponds to pre-defined number of coded bits.

\* \* \* \* \*